(12) United States Patent
Nakamura et al.

(10) Patent No.: US 6,305,428 B1
(45) Date of Patent: Oct. 23, 2001

(54) FLEXIBLE HOSES

(76) Inventors: Sakuro Nakamura; Hidenori Shima, both of c/o Tigers Polmer Corporation, R & D Center; 1-6, Takatsukadai 2-chome, Nishi-ku, Kobe-shi, Hyogo 651-2271 (JP)

( * ) Notice: Subject to any disclaimer, the term of this patent is extended or adjusted under 35 U.S.C. 154(b) by 0 days.

(21) Appl. No.: 09/577,482

(22) Filed: May 25, 2000

(30) Foreign Application Priority Data

May 28, 1999 (JP) .................................................. 11-149014

(51) Int. Cl.[7] ....................................................... F16L 11/10
(52) U.S. Cl. .......................... 138/126; 138/122; 138/133; 138/DIG. 3; 138/127; 428/36.91
(58) Field of Search ................................... 138/125, 126, 138/127, 133, DIG. 3, 122; 428/36.91

(56) References Cited

U.S. PATENT DOCUMENTS

| | | | |
|---|---|---|---|
| 3,990,479 | * 11/1976 | Stine et al. | 138/125 |
| 4,098,298 | * 7/1978 | Vohrer | 138/129 |
| 4,490,575 | * 12/1984 | Kutnyak | 138/129 |
| 4,553,568 | * 11/1985 | Piccoli et al. | 138/125 |
| 4,870,995 | * 10/1989 | Igarashi et al. | 138/126 |
| 5,476,121 | * 12/1995 | Yoshikawa et al. | 138/127 |
| 5,601,119 | * 2/1997 | Kanao | 138/122 |
| 5,702,132 | * 12/1997 | Friederich et al. | 138/127 |
| 5,778,941 | * 7/1998 | Inada | 138/127 |
| 6,024,134 | 2/2000 | Akedo et al. . | |
| 6,037,025 | * 3/2000 | Matsunaga et al. | 138/126 |

* cited by examiner

Primary Examiner—James Hook
(74) Attorney, Agent, or Firm—Pillsbury Winthrop LLP

(57) ABSTRACT

The hose of the present invention comprises a soft hose wall (A) and a spiral reinforcement (B) for retaining the configuration of the hose. The hose wall (A) is formed with a composition comprised of: a resin component (A1) containing a diene-series or hydrogenated diene-series rubber component, and an olefinic resin; and a lubricant (A2). The rubber component may be a random or block copolymer of styrene and butadiene. The olefinic resin may be a polypropylene-series resin. The lubricant (A2) may be a higher fatty acid or its derivative (e.g., a higher fatty acid amide), a higher alcohol or its derivative, a hydrocarbon-series wax, an organopolysiloxane, or fluorine-containing resin. The present invention provides a hose which is lighter, free from PVC, and capable of maintaining excellent flexibility even used for a long period of time.

10 Claims, 2 Drawing Sheets

1

FLEXIBLE HOSES

FIELD OF THE INVENTION

The present invention relates to hoses excellent in flexibility and useful as electric cleaner hoses.

BACKGROUND OF THE INVENTION

Due to their excellence in thermal moldability and low production cost, hoses mainly formed with polyvinyl chloride resins (PVC) have generally been employed as electric cleaner hoses. For example, hoses composed of a hose wall and a wire reinforcement covered with a resin and united with the hose wall are known. A hose like these can be fabricated by spirally winding a resin-covered wire reinforcement, which is a steel wire covered with a PVC resin, around a mandrel, further covering the resin-covered reinforcement with a tube of a soft PVC resin or spirally winding a tape of a soft PVC resin around the resin-covered reinforcement to form a hose wall, separating the hose thus formed from the mandrel. In the hose thus obtained, the hose wall and the resin-covered reinforcement are bonded together or fused such as to be unitary with each other.

However, for making soft PVC resins flexible, a variety of liquid plasticizers are added thereto. When hoses fabricated with such soft PVC resins are used over long periods of time, the plasticizers contained therein begin to bleed out (seep out) on their surfaces. As a result, the plasticizer content of the PVC is lowered with an increase in hardness (stiffness). Consequently, these hoses become less flexible and their risk of fatigue failure becomes higher as the hoses are bent repeatedly.

In addition, with such recent global environmental problems as poisonous gases generated by burning PVC waste leading to an acid rain as well as the PVC itself being considered carcinogenic, there is a trend toward imposing restrictions on the use of PVC resins. Moreover, hoses made with PVC resins are rather heavy and difficult to handle.

U.S. Pat. No. 6,024,134 discloses a hose which comprises a hose wall formed by spirally winding a laminated tape and bonding the adjacent side edges of the covering layer each other, and a hard spiral reinforcement for reinforcing the hose wall and retaining the hose configuration, wherein the laminated tape is constituted of a main layer of a polyester-series thermoplastic resin polyurethane resin and a covering layer of a soft resin is laminated on at least one surface of the main layer. This literature describes that this hose is excellent in flexibility and durability, the degree of its shrinkage is low, and that it can favorably be used as a duct hose.

SUMMARY OF THE INVENTION

Thus, an object of the present invention is to provide a flexible hose capable of maintaining its excellent flexibility over a long period of time.

Another object of the present invention is to provide a lighter hose with excellent flexibility without using a halogen-series resin (e.g., PVC).

Still another object of the present invention is to provide a hose which is useful as an electric cleaner hose.

The inventors of the present invention made intensive studies to achieve the above objects and finally found that a hose with excellent flexibility can be obtained by: forming a hose wall with a resin composition comprised of a resin component containing a specific rubber component and an olefinic resin, and a lubricant to be added to the resin component; and providing a spiral reinforcement of an olefinic resin whereby the shape of the hose wall is maintained. The present invention was accomplished based on the above findings.

In summary, the flexible hose of the present invention comprises a soft hose wall (A) and a spiral reinforcement (B) for retaining the configuration of the hose. The hose wall (A) is formed with a composition comprised of (A1) a resin component containing a diene-series or hydrogenated diene-series rubber component and an olefinic resin, and (A2) a lubricant.

The rubber component may be a random or block copolymer of styrene and butadiene. The olefinic resin may be a polypropylene-series resin. The ratio of the rubber component to the olefinic resin may be about 30/70 to 95/5 (weight ratio). The lubricant (A2) may be a higher fatty acid or its derivative (e.g., a higher fatty acid amide), a higher alcohol or its derivative, a hydrocarbon-series wax, a polyorganosiloxane (e.g., a silicone oil), or a fluorine-containing resin. The amount of the lubricant (A2) may be 0.1 to 10 parts by weight relative to 100 parts by weight of the resin component (A1) constituting the hose wall. The spiral reinforcement (B) is formed with an olefinic resin (B1) harder than the resin component (A1) of the hose wall. The modulus of bending elasticity of the spiral reinforcement (B), determined by a tension test in accordance with Japanese Industrial Standard K 6758, may be 10,000 kgf/cm$^2$ or higher. The spiral reinforcement may be hollow, and into the hollow may be inserted an electric conductor.

DETAILED DESCRIPTION OF THE INVENTION

Hereinafter, the present invention will be described in further detail with reference to the attached drawings.

Figure 1:
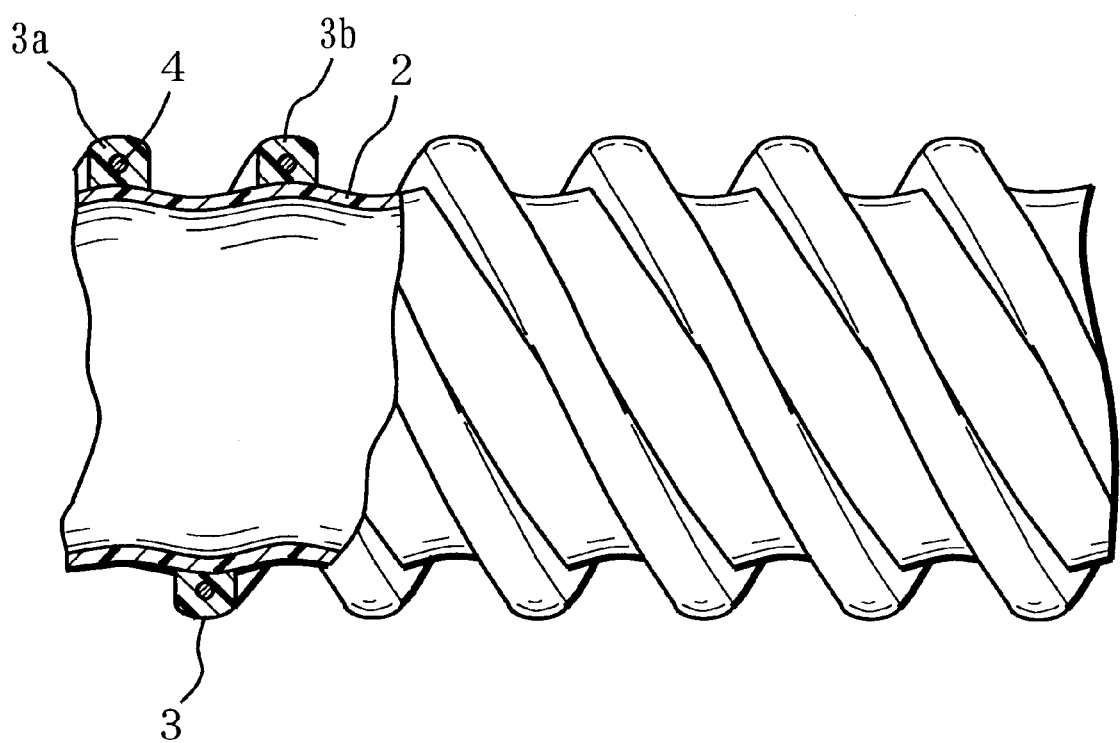
FIG. 1 is a partial sectional view of the hose of the present invention.
Figure 2:
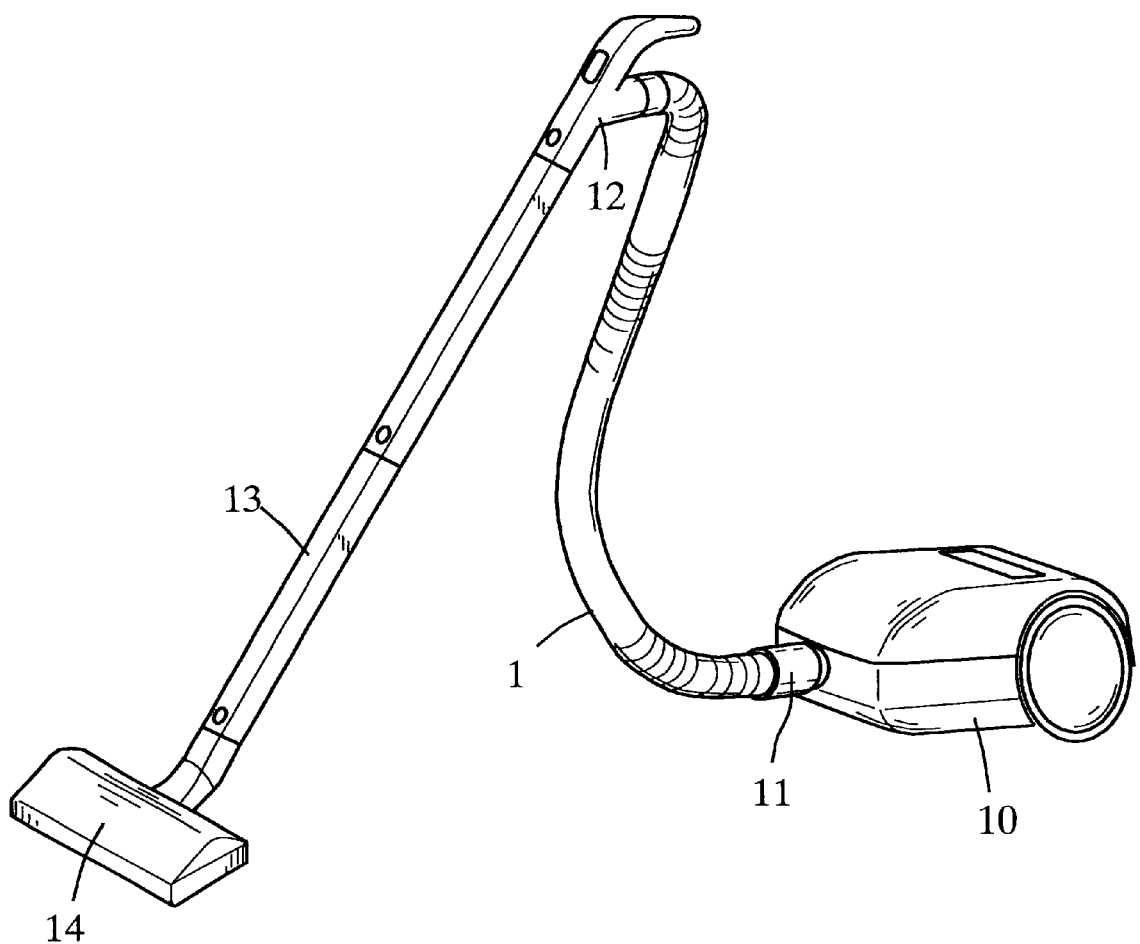
FIG. 2 is a perspective view of the entire body of an electric cleaner with the flexible hose of the present invention.

FIG. 1 is a partial sectional view of the flexible hose of the present invention, and FIG. 2 is a perspective view showing the entire body of an electric cleaner with the flexible hose of the present invention as its cleaner hose.

The electric cleaner shown in FIG. 2 comprises a main body 10 having a suction port, a joint pipe 11 detachably connected to the suction port of the main body 10, a flexible hose 1 one end of which is detachably connected to the joint pipe 11, a grip 12 joined to the other end of the hose 1 and equipped with an operation unit, at least one extension pipe 13 detachably connected to the grip 12, and a suction unit (nozzle) 14 with a brush attached to the other end of the extension pipe 13.

As shown in FIG. 1, the flexible hose 1 comprises a soft hose wall 2, two spiral reinforcements 3a and 3b provided on the outer surface of the hose wall 2. The shape of the hose is retained by the spiral reinforcements 3a and 3b. The spiral reinforcements 3a and 3b are bonded to or fused with the hose wall at a double pitch. Each of the spiral reinforcements 3a and 3b is hollow (i.e., hollow configuration). In the hollows are inserted electric conductors 4 of copper wires with play.

The hose wall 2 is formed with a resin composition comprising a resin component containing a diene-series rubber component (e.g., a hydrogenated styrene-butadiene copolymer (HSBR)) and an olefinic resin (e.g., polypropylene (PP)), and a lubricant (e.g., a fatty acid amide) as an additive. In the resin composition, the rubber component significantly improves the softness of the hose wall because of its good compatibility with the olefinic resin. Also, the hardness of the hose wall is adjustable, because the repulsiveness of the olefinic resin against negative pressure (e.g., suction force from the electric cleaner body direction) is excellent. Moreover, the lubricant improves the self-adhesive properties of the rubber component, preventing part of the hose wall from adhering to other parts of the hose wall and noises (sticky noises) caused when the hose contracts or is bent. The resin composition having such make-up is free from bleed-out of the plasticizer and can maintain its flexibility for a long period of time.

The spiral reinforcements 3a and 3b are formed with a hard synthetic resin compatible with the resin composition of the hose wall (e.g., an olefinic resin such as polypropylene). Therefore, it is possible to bond the spiral reinforcements 3 and the hose wall 2 together firmly. Also, since the olefinic resin of the spiral reinforcement 3 is heat-fusible with the resin component of the hose wall 2, the spiral reinforcement 3 can be steadily fixed on the outer surface of the hose wall 2 after being spirally wound along the outer surface.

The electric conductor 4 is inserted in the hollow of each of the spiral reinforcements 3 with play. The electric conductor 4 is composed of, for example, a plurality of copper wire twisted into one. The way of inserting the electric conductor 4 with play is as follows: Insert the conductor into the center of the extrusion head in advance of the extrusion of the hard synthetic resin of the spiral reinforcement 3, and extrude the resin such as not to bring the resin into tight contact with the conductor confined therein but to leave a gap between them. In FIG. 2, the insertion of such electric conductor enables the grip 12 to send electric signals to the main body 10 through the flexible hose 1.

Hoses like this are free from bleed-out of plasticizers contained therein, keep their flexibility even used over long periods of time, and are excellent in moldabilitiy. In addition, these hoses are lighter than conventional PVC hoses, for their spiral reinforcements can be made with synthetic resins. Making the hose wall and the reinforcement with resins of the same series leads to improvements in adhesion between them and durability.

The structure of the flexible hose of the present invention is not limited to that shown in FIG. 1 and the hose may have a different structure.

As illustrated in FIG. 1, the spiral reinforcement 3 need only be capable of retaining the configuration of the hose and may be provided along the outer or inner surface of the hose wall, or embedded within the hose wall. The reinforcement 3 is fixed by bonding, fusing, or other means. A plurality of spiral reinforcements may be wound around the hose wall at a suitable pitch (a single pitch, a double pitch, a triple pitch).

A plurality of electric conductors may be inserted in the hollow of the spiral reinforcement.

[Hose Wall]

The hose wall is formed with a composition composed of (A1) a resin component containing a diene-series or hydrogenated diene-series rubber component and an olefinic resin, and (A2) a lubricant.

Since the diene-series or hydrogenated dieneseries rubber is excellent in compatibility with the olefinic resin formed with the hose wall, the flexibility of the hose wall is significantly improved.

Examples of the rubber component include homo- or copolymers of dienes [e.g., conjugated dienes such as butadiene, isoprene, and 2-chloro-1,3-butadiene], and their hydrogenated products. Examples of the rubber component also include copolymers of the dienes and copolymerizable components [e.g., aromatic vinyl monomers such as styrene, (meth)acrylic monomers such as acrylonirtile, olefinic monomers such as ethylene and propylene], and their hydrogenated products. These copolymerizable components may be used either singly or in combination. As to the copolymers mentioned above, the type of copolymerization is not particularly restricted, and may be random, block, or graft copolymerization.

Preferred as the rubber component are conjugated diene-series rubbers, for example, homopolymers of conjugated 1,3-dienes typified by polybutadiene, polyisoprene, and natural rubber; random or block copolymers of styrene and butadiene (e.g., styrene-butadiene block copolymer, styrene-butadiene-styrene block copolymer); copolymers of butadiene-acrylonitrile rubber, styrene-isoprene rubber, chloroprene rubber, or nitrile rubber; and their hydrogenated products (e.g., styrene-ethylene-butylene-styrene rubber, styrene-ethylene-propylene-styrene rubber). Hydrogenated products of the conjugated diene-series rubbers (e.g., hydrogenated products of styrene-butadiene copolymer) are particularly preferred.

A non-diene-series rubber [e.g., ethylene-vinyl acetate copolymer, acrylic rubber, ethylene-propylene rubber (EPDM), polyethylene chloride) may be used together, provided that the amount of which is small. The rubber component may be cross-linked using a crosslinking-agent (e.g., a sulfur-series crosslinking agent, a non-sulfur-series crosslinking agent such as a peroxide).

Exemplified as the olefinic resin are homo-or copolymers of olefins. Examples of the olefins are $C_{2-10}$ olefins (preferably, $\alpha$-$C_{2-8}$olefins), such as ethylene, propylene, 1-butene, isobutene, 4-methyl-1-butene, 1-pentene, 3-methyl-1-pentene, 1-hexene, and 1-octene. These olefins can be used either singly or in combination. Included among the preferred olefins are ethylene and propylene, with propylene particularly preferred.

The olefinic resin may be a copolymer of an olefin and a copolymerizable monomer. As the copolymerizable monomer, there are exemplified unsaturated carboxylic acids such as (meth)acrylic acid and maleic acid, and derivatives thereof (e.g., maleic anhydride); (meth)acrylates; and vinyl esters (e.g., vinyl acetate, vinyl propionate). These copolymerizable monomers can be used either singly or in combination. The amount of the copolymerizable monomer can be selected within the range of, relative to 100 parts by weight of the olefin, about 0 to 100 parts by weight, preferably about 1 to 50 parts by weight, and more preferably about 5 to 25 parts by weight.

Exemplified as the olefinic resin are polyethylene-series resins (e.g., low-, medium-, or high-density polyethylene, linear low-density polyethylene, ethylene-propylene copolymer, ethylene-(meth)acrylic acid copolymer, ionomers, ethylene-(meth)acrylic acid esters, ethylene-vinyl acetate copolymer), polypropylene-series resins (i.e., polymers containing 50% by weight or more (about 60 to 100% by weight) of a propylene unit (e.g., polypropylene, propylene-ethylene copolymer, propylene-butene copolymer, propylene-ethylene-butene copolymer). Preferred as the olefinic resin is a polypropylene-series resin.

The ratio of the rubber component to the olefinic resin is the former/the latter (weight ratio)=about 30/70 to 95/5, preferably about 35/75 to 90/10, more preferably about 40/60 to 90/10, and particularly 40/60 to 85/15. The use of a resin composition having such make-up makes it possible to provide a hose whose softness and hardness are adjustable and excellent in flexibility.

The hardness of such resin component (A1), determined by a hardness test (spring hardness test (A-type) defined in Japanese Industrial standard (JIS) K 6301), is about 40 to 80, preferably 40 to 70, more preferably 50 to 75, and particularly about 55 to 70.

Examples of the lubricant (A2) are higher fatty acids or derivatives thereof, higher alcohols or derivatives thereof, hydrocarbon-series waxes, organopolysiloxane, and fluorine-containing resins.

Exemplified as the derivatives of the higher fatty acids are higher fatty acid esters, metal salts of the higher fatty acids, and amides of the higher fatty acids. Examples of the higher alcohols are their esters.

Examples of the higher fatty acids are saturated fatty acids, such as saturated higher $C_{10-30}$fatty acids (preferably, saturated $C_{12-26}$fatty acids, more preferably saturated $C_{14-24}$ fatty acids) typified by lauric acid, myristic acid, palmitic acid, stearic acid, isostearic acid, behenic acid, lignoceric acid, cerotic acid, montanic acid, and mellisic acid; unsaturated fatty acids (e.g., unsaturated higher $C_{10-30}$fatty acids (preferably, unsaturated $C_{12-26}$fatty acids, more preferably unsaturated $C_{14-24}$fatty acids) such as oleic acid, erucic acid, and linolenic acid). The carbon chain of the higher fatty acid may have a variety of substituents (e.g., hydroxyl group, $C_{1-4}$alkoxyl groups). These higher fatty acids can be used either singly or in combination. Included among the preferred higher fatty acids are saturated $C_{14-24}$fatty acids (particularly, saturated $C_{6-22}$fatty acids) such as stearic acid and hydroxystearic acid.

The fatty acid esters can be obtained by reacting the higher fatty acids with alcohols. Examples of the alcohols are monohydric alcohols [monohydric aliphatic $C_{1-30}$ alcohols (preferably, aliphatic $C_{4-26}$ alcohols) such as butyl alcohol, hexyl alcohol, 2-ethylhexyl alcohol, n-octyl alcohol, n-decyl alcohol, lauryl alcohol, and stearyl alcohol)]; polyhydric alcohols [$C_{2-8}$alkylenediols such as ethylene glycol and propyrene glycol; poly$C_{2-4}$alkylene glycols such as polyethylene glycol; glycerol; trimethylolpropane; pentaerythritol; sorbitol]. Theses alcohols can be used either singly or in combination. The polyhydric alcohols (particularly, glycerol) are preferred.

As the fatty acid esters, there are exemplified esters of saturated $C_{12-24}$fatty acids and aliphatic $C_{4-20}$ alcohols (e.g., butyl stearate, decyl stearate); mono- or diesters of saturated or unsaturated $C_{12-24}$fatty acids and Poly$C_{2-4}$alkylene glycols (e.g., polyethylene glycol mono(or di)stearate, polyethylene glycol mono(or di)oleate); esters of saturated $C_{12-24}$ fatty acids and glycerol [e.g., stearic acid mono(di-, or tri)glyceride, behenic acid mono(di-, or tri)glyceride), polyoxyethylene glycerin mono(di-, or tri-)stearates; esters of unsaturated $C_{12-24}$fatty acids and glycerol [e.g., oleic acid mono(di-, or tri)glyceride, linoleic acid mono(di-, or tri) glyceride, recinolic acid mono(di-, or tri)glyceride].

Also included among the fatty acid esters are hydrogenated products of higher fatty acid glycerides (e.g., castor oil, soya bean oil, cotton seed oil).

Metal salts of the fatty acids are, for example, salts with alkaline metals; salts with alkaline earth metals (e.g., magnesium, calcium) such as saturated or unsaturated $C_{12-24}$ fatty acid salts (e.g., magnesium stearate, calcium stearate, barium stearate, barium laurate); and salts with elements of the Group 2B of the Periodic Table of Elements (e.g., zinc) such as saturated or unsaturated $C_{12-24}$fatty acid salts (e.g., zinc stearate).

Examples of the fatty acid amides are saturated $C_{12-26}$ fatty acid amides (saturated $C_{12-24}$fatty acid amides, such as stearic acid amide) and unsaturated $C_{12-26}$fatty acid amides (unsaturated $C_{12-24}$fatty acid amides, such as erucic acid amide, oleic acid amide).

Included among the fatty acid amides are reaction products of fatty acids and alkylenediamines (e.g., $C_{1-4}$alkylenediamines such as methylenediamine, ethylenediamine and propylenediamine) [e.g., reaction products of saturated $C_{12-24}$fatty acids and ethylenediamine, such as ethylene-bis-stearylamide, ethylene-bishydroxystearylamide, and methylene-bis-stearylamide-N, N'-ethylene-bis-stearylamide; reaction products of unsaturated $C_{12-24}$fatty acids and ethylenediamine, such as ethylene-bis-oleylamide and ethylene-bishydroxyoleylamide].

These fatty acid amides can be used either singly or in combination.

As to the higher alcohols, the alcohols exemplified above and others are available (e.g., $C_{4-26}$aliphatic alcohols). Exemplified as the higher alcohol esters are esters with aromatic carboxylic acids (e.g., phthalic diesters such as phthalic distearate).

As to the hydrocarbon-series waxes, there may be mentioned paraffin waxes (e.g., polyethylene-series waxes such as silicone graft polyethylene), microcrystalline wax, and carnauba wax. These hydrocarbon-series waxes can be used either singly or in combination.

Examples of the organopolysiloxanes (silicone) are $C_{1-4}$alkylpolysiloxanes such as dimethylpolysiloxane, $C_{1-4}$alkylarylpolysiloxanes such as methylphenylpolysiloxanes, and diarylpolysiloxanes such as diphenylpolysiloxanes. The structure of the organopolysiloxane is not particularly restricted and may for example has a straight-chain, cyclic, or branched structure. A straight-chain or cyclic organopolysiloxane is usually employed. A relatively low-molecular weight linear polysiloxane (silicone oil), such as dimethylpolysiloxane, is preferably used as the organopolysiloxane. Particularly, the viscosity (at 25° C.) of the silicone oil is, for example, about 5 to 1,000,000 mPa·s, preferably about 10 to 500,000 mPa·s, and more preferably about 100 to 100,000 mPa·s.

Examples of the fluorine-containing resins are polytetrafluoroethylene (PTFE), polychlorotrifluoroethylene (PCTF), polyvinylidene fluoride (PVDF), polyvinyl fluoride (PVF), tetrafluoroethylene-hexafluoropropylene copolymer (PFEP), tetrafluoroethylene-ethylene copolymer (PETFE), tetrafluoroethylene-perfluoroalkylvinylether copolymer (PFA), and others.

Preferred as the lubricant (A2) is, for example, a fatty acid amide (e.g., a saturated $C_{14-24}$fatty acid amide, such as stearic acid amide; an unsaturated $C_{14-24}$fatty acid amide, such as oleic acid amide and erucic acid amide), or a silicone oil.

The addition of such lubricant (A2) to the resin component prevents the hose wall from adhering to itself. Particularly, the use of a silicone oil as a lubricant leads to an decrease in the frictional coefficient of the hose wall surface, consequently preventing the wear and abrasion of the hose wall through being rubbed against itself when the hose is bent. As a result, the wear resistance is improved.

The amount of the lubricant is, relative to 100 parts by weight of the resin component, about 0.01 to 10 parts by weight, preferably 0.05 to 5 parts by weight, and more preferably about 0.1 to 3 parts by weight (particularly, 0.2 to 3 parts by weight). In the case where the lubricant is a silicone oil, the amount of the silicone oil is, relative to 100 parts by weight of the resin component, about 0.01 to 10 parts by weight, preferably about 0.05 to 3 parts by weight, and more preferably about 0.1 to 1 part by weight. The use of too much lubricant causes deterioration in moldability.

[Spiral Reinforcement]

The spiral reinforcement (B) is made with a resin which is harder than the resin component constituting the hose wall. As the resin for the spiral reinforcement, for example, the olefinic resins exemplified in the item "Hose wall" are available (e.g., polypropylene-series resin).

The modulus of bending elasticity of the polyolefinic resin forming the spiral reinforcement, determined by a tension test in accordance with JIS K 6758, is about 10,000 kgf/cm$^2$ or more, preferably about 10,000 to 100,000 kgf/cm$^2$ and more preferably about 30,000 to 50,000 kgf/cm$^2$ (kgf/cm$^2$=9.8 ×10$^4$ Pa).

[Electric Conductor]

As the electric conductor, silver, copper, and aluminium can be used. Such electric conductor can be used either singly or in combination with other conductors.

The diameter of the electric conductor is not particularly limited. For example, when the hose is used as an electric cleaner hose, the diameter can suitably be selected within the range of about 0.01 to 1 mm. A plurality of electric conductors may be used. For example, an electric conductor constituted of 5 to 10 copper wires twisted together may be used.

As to the hose wall and spiral reinforcement, to the resins (or resin compositions) forming the hose wall and the spiral reinforcement may be added a variety of additives, provided that the characteristics of the resins are not deteriorated. Examples of the additives are stabilizers (antioxidants, ultraviolet ray absorbers, thermostabilizers), antistatic agents, flame retardants, coloring agents, fillers, and other lubricating agents. Insofar as the characteristics of the hose wall and the spiral reinforcement are not deteriorated, to the resins (or resin compositions) may be added other resins (e.g., polyester resins, polyamide resins) in small amounts.

Although the hose of the present invention is fabricated without using a halogen-series resin (PVC), it is excellent in flexibility and its excellent flexibility is not deteriorated even the hose is used over a long period of time. Moreover, the hose of the present invention is lighter and easier to handle than conventional PVC hoses. Therefore, the hose of the present invention is suitable for a variety of uses, and examples of which is an electric cleaner hose.

What is claimed is:

1. A flexible hose comprising a soft hose wall (A) and a spiral reinforcement (B) for retaining the configuration of the hose, in which the hose wall (A) is formed with a composition comprising a resin component (A1) containing a diene-series or hydrogenated diene-series rubber component and an olefinic resin, and a lubricant (A2), wherein the soft hose wall has a non-laminated structure comprising an inner layer and an outer layer, wherein the olefinic resin in the resin composition (A1) comprises a polypropylene-series resin, the lubricant (A2) is at least one member selected from the group consisting of a higher fatty acid or its derivative, a higher alcohol or its derivative, a hydrocarbon-series wax, an organopolysiloxane, and a fluorine-series resin, and the spiral reinforcement (B) comprises an olefinic resin.

2. A flexible hose according to claim 1, wherein the rubber component is a random or block copolymer of styrene and butadiene.

3. A flexible hose according to claim 1, wherein the weight ratio of the rubber component to the olefinic resin is 30/70 to 95/5.

4. A flexible hose according to claim 1, wherein the lubricant (A2) is at least one member selected from the group consisting of a higher fatty acid amide and a silicone oil.

5. A flexible hose according to claim 1, wherein the amount of the lubricant (A2) is 0.1 to 10 parts by weight relative to 100 parts by weight of the resin component (A1).

6. A flexible hose according to claim 1, wherein the spiral reinforcement (B) is formed with an olefinic resin (B1) having a hardness higher than that of the resin component (A1) of the hose wall.

7. A flexible hose according to claim 1, wherein the spiral reinforcement (B) is formed with an olefinic resin (B1) having a modulus of bending elasticity of 10,000 kgf/cm$^2$ or more as determined by a tension test according to Japanese Industrial Standard K 6758.

8. A flexible hose according to claim 1, wherein the spiral reinforcement (B) is hollow, and an electric conductor is inserted in the hollow.

9. A flexible hose according to claim 1, which is an electric cleaner hose.

10. A flexible hose according to claim 1, wherein the hose wall (A) is formed with a composition comprising (A1) the resin component containing a random or block copolymer of styrene and butadiene and a polypropylene-series resin, and (A2) at least one lubricant selected from a saturated or unsaturated $C_{14-24}$ fatty acid amide and a silicone oil; and (B) the spiral reinforcement is formed with a polypropylene-series resin.

* * * * *

UNITED STATES PATENT AND TRADEMARK OFFICE
CERTIFICATE OF CORRECTION

PATENT NO. : 6,305,428 B1
APPLICATION NO. : 09/577482
DATED : October 23, 2001
INVENTOR(S) : Nakamura et al.

It is certified that error appears in the above-identified patent and that said Letters Patent is hereby corrected as shown below:

Title Page, Add
Item [73] Assignee: Tigers Polymer Corporation, Toyonaka-shi, Japan Signed and Sealed this Sixteenth Day of September, 2008

JON W. DUDAS
*Director of the United States Patent and Trademark Office*